United States Patent [19]

Nakamura

[11] 4,296,423

[45] Oct. 20, 1981

[54] DEVICE FOR ADJUSTING IMAGE DENSITY IN COMPOSITE INFORMATION RECORDING APPARATUS

[75] Inventor: Hiroya Nakamura, Hino, Japan

[73] Assignee: Konishiroku Photo Industry Co., Ltd., Tokyo, Japan

[21] Appl. No.: 66,423

[22] Filed: Aug. 14, 1979

[30] Foreign Application Priority Data

Aug. 18, 1978 [JP] Japan ............................... 53-100017

[51] Int. Cl.3 ..................... G01D 15/40; G03G 15/00; G03G 15/00

[52] U.S. Cl. .................................... 346/160; 355/3 R; 355/14 D; 355/14 E

[58] Field of Search ................ 355/14 R, 14 E, 14 D, 355/3 R, 6; 358/300; 346/158, 160

[56] References Cited

U.S. PATENT DOCUMENTS 2,889,758 6/1959 Bolton .................................... 355/6

3,149,201 9/1964 Huber et al. .................... 346/160 X 3,409,901 11/1968 Dost et al. .................... 355/14 D X 4,087,171 5/1978 Yano ............................ 355/14 E X 4,124,286 11/1978 Barasch ........................ 355/14 R X 4,134,668 1/1979 Coburn .......................... 346/160 X 4,167,324 9/1979 Wu ..................................... 355/3 R

*Primary Examiner*—Aristotelis M. Psitos

*Attorney, Agent, or Firm*—Bierman & Bierman

[57] ABSTRACT

An apparatus for composite recording in accordance with copying and recording operations which includes a medium for receiving an electrostatic latent image, a developing electrode for development of the latent image, a bias voltage supply for application between the medium and the developing electrode, and a signal reproducing device for use in the recording operation, is further provided with a device for adjusting image density in the recording operation in accordance with selective adjustment of image density in the copying operation.

2 Claims, 2 Drawing Figures

DEVICE FOR ADJUSTING IMAGE DENSITY IN COMPOSITE INFORMATION RECORDING APPARATUS

BACKGROUND OF THE INVENTION

1. Field of the Invention:

The present invention relates to a device for adjusting or regulating an image density reproduced in a composite information copying apparatus imparted with a function for recording in a composite manner electric information signals available from external sources together with an image of an original to be copied.

2. Description of the Prior Art

The composite information recording apparatus of the above type comprises generally an optical system 3 for projecting an image of an original resting on a copy board 1 to a drum 2 having a photoconductive or light sensitive surface layer such as of Se, CdS thereon, a reproducing device 4 for reproducing electric information signals on the light sensitive drum 2 as an electrostatic latent image, and a developing device 5 such as a magnetic brush developing device for visualizing and recording the electrostatic latent image on the light sensitive drum 2 by using toner as per se well known in the field. With copying apparatus of such arrangement, it is possible to record the image of an original or electric information signals from the reproducing device, respectively, or alternatively a combination of the image of the original and the electric information signal in a composite matter in which a part of the recorded information is derived through the optical system, while the other part is derived from the reproducing device.

For preparing a sheet or a page of data containing image information from the original and the electric information signal from the external source in a composite manner in the composite information recording apparatus, there may arise the possibility that non-uniformity in the image density distribution will occur, if the light intensity of the image optically projected onto the drum surface and the intensity of the light beam flux output from the reproducing device (such as an optical fiber tube) are not balanced with each other.

BRIEF SUMMARY OF THE INVENTION

The invention contemplates to solve the problem described above and has as an object to provide an image density adjusting device which assures a uniform image density in the composite record.

DETAILED DESCRIPTION OF THE PREFERRED EMBODIMENT

Figure 1:
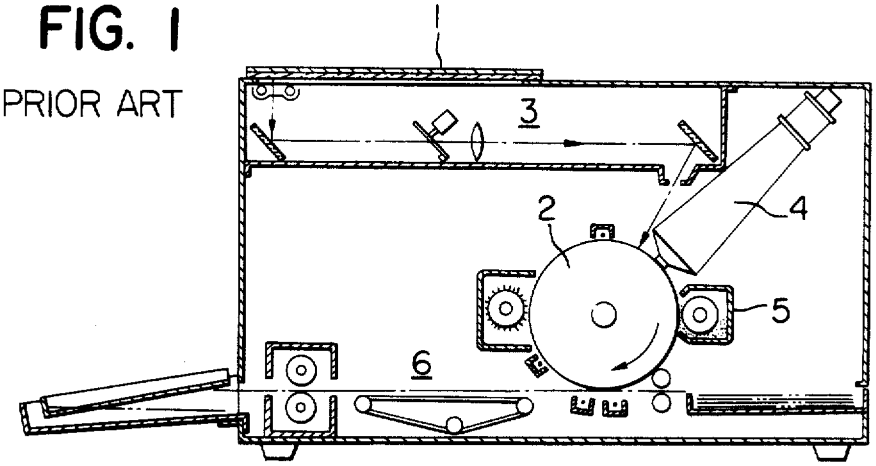
FIG. 1 PRIOR ART
FIG. 1 shows schematically a general arrangement of a composite information recording apparatus.
Figure 2:
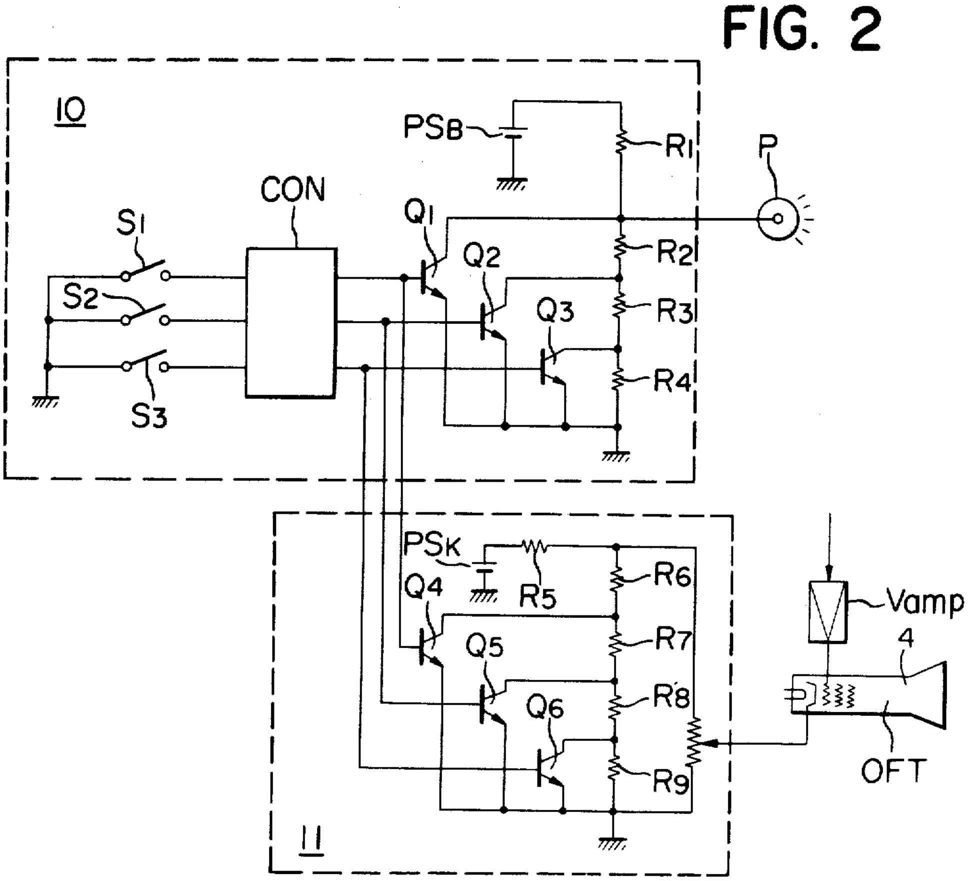
FIG. 2 is a circuit diagram illustrating a method of adjusting image density according to the invention.

FIG. 2 is a circuit diagram illustrating an apparatus for controlling image density in accordance with the invention. A broken line block 10 denotes an image density control unit for controlling the image density of an original to be copied and serves to control the bias voltage applied between the photoconductive medium and the developing device (e.g. a sleeve made of non-magnetic and electrically conductive material which is one element constituting a magnetic brush) in dependence on a preset density of the original to be copied, thereby to vary the quantity of toner deposited on the surface of the photoconductive medium for a constant intensity of irradiation by an illuminating lamp. More specifically, in dependence upon the inputs to the selecting switches $S_1$, $S_2$ and $S_3$ for selecting a high density, a normal density and a low density of the image to be copied, respectively, a selected one of transistor switches $Q_1$, $Q_2$ and $Q_3$ is turned on by a control unit CON, as a result of which the voltage dividing ratio of the voltage dividing resistor circuit including resistors $R_1$ to $R_4$ is correspondingly varied thereby to change the bias voltage applied to a developing electrode P from a bias voltage source $PS_B$.

A broken line block 11 denotes a recording density control unit for controlling the output light intensity from an optical fiber tube constituting the output unit for recording electric information signals from a reproducing device. The recording control unit 11 includes a resistor type voltage dividing circuit composed of switching means or transistor switches $Q_4$, $Q_5$ and $Q_6$ and resistors $R_5$ to $R_9$ for controlling the voltage applied to the cathode terminal of an optical fiber tube OFT for a video signal supplied from a video or pulse amplifier Vamp to the optical fiber tube OFT. By varying the voltage applied to the cathode of the tube OFT from a (cathode) voltage source $PS_K$ through the voltage dividing circuit, it is possible to control the output intensity of the optical fiber tube OFT. The on-off control of the transistor switches $Q_4$, $Q_5$ and $Q_6$ is effected in association or correspondence with the transistor switches $Q_1$, $Q_2$ and $Q_3$ through the control unit CON. Thus, the density control of the original image will result in corresponding density control for the recording of electric information signals.

In this manner, the density at which the electric information is recorded is automatically varied in dependence on the density set for copying the original image, whereby a uniform density distribution can be attained in the composite recording.

The number of steps at which the density is controlled can be arbitrarily changed by correspondingly modifying the configurations of the transistor switch circuits and the voltage dividing resistor circuits. Of course, the control may be effected in a continuous or linear manner. Furthermore, the density control may be accomplished by controlling the iris aperture of the optical system in place of controlling the bias voltage applied to the developing electrode. In the reproducing system, a gain control may be adopted in place of controlling the cathode voltage applied to the OFT.

As will be appreciated from the foregoing description, the output light intensity of the reproducing system for electrical information is controlled in correspondence with the density control for copying the original image according to the invention. Thus, a uniform density distribution can be accomplished in the composite recording.

What is claimed is:

1. In a composite information recording apparatus including a photoconductive medium on which an electrostatic latent image is formable in accordance with a copying and/or a recording operation, a developing device having a developing electrode for developing the latent image on the photoconductive medium, means for supplying a bias voltage applied between the developing electrode and the photoconductive medium, and a signal reproducing device for use in the recording operation; an image density adjusting device, comprising:

switch means operable for selectively adjusting the bias voltage applied to the developing electrode in accordance with the density of an original to be copied;

means supplying a variable voltage to said signal reproducing device; and further means operable by said switch means for controlling said variable voltage supply means to apply a variable voltage to said signal reproducing device in correspondence with the selectively adjusted bias voltage applied to the developing electrode, whereby image density of the recording operation is controlled in accordance with image density control of the copying operation.

2. In a composite information recording apparatus according to claim 1, the signal reproducing device comprising an optical fiber tube.

* * * * *